United States Patent
Yi et al.

(10) Patent No.: US 10,567,987 B2
(45) Date of Patent: Feb. 18, 2020

(54) METHOD AND APPARATUS FOR CHANGING COVERAGE ENHANCEMENT/REPETITION LEVEL USED FOR RADIO LINK MONITORING IN WIRELESS COMMUNICATION SYSTEM

(71) Applicant: LG ELECTRONICS INC., Seoul (KR)

(72) Inventors: Yunjung Yi, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/542,806

(22) PCT Filed: Jan. 18, 2016

(86) PCT No.: PCT/KR2016/000509
§ 371 (c)(1),
(2) Date: Jul. 11, 2017

(87) PCT Pub. No.: WO2016/114639
PCT Pub. Date: Jul. 21, 2016

(65) Prior Publication Data
US 2017/0374570 A1 Dec. 28, 2017

Related U.S. Application Data

(60) Provisional application No. 62/104,083, filed on Jan. 16, 2015.

(51) Int. Cl.
*H04W 72/04* (2009.01)
*H04W 24/08* (2009.01)
*H04L 1/00* (2006.01)

(52) U.S. Cl.
CPC .............. *H04W 24/08* (2013.01); *H04L 1/00* (2013.01)

(58) Field of Classification Search
CPC ................................. H04W 24/08; H04L 1/00
See application file for complete search history.

(56) References Cited

U.S. PATENT DOCUMENTS

2014/0098761 A1* 4/2014 Lee ..................... H04W 74/006
370/329
2016/0192376 A1* 6/2016 Lee ....................... H04W 48/20
370/252

FOREIGN PATENT DOCUMENTS

WO  WO 2013/060763 A1  5/2013
WO  WO 2014/055878 A1  4/2014

OTHER PUBLICATIONS

3GPP TSG RAN WG1 #75, R1-135382, Nov. 11-15, 2013, Determining the Reception level during initial random access and non-initial random access.*

(Continued)

*Primary Examiner* — Lakeram Jangbahadur
(74) *Attorney, Agent, or Firm* — Birch, Stewart, Kolasch & Birch, LLP

(57) ABSTRACT

A method and apparatus for performing radio link monitoring (RLM) in a wireless communication system is provided. A user equipment (UE), which requires coverage enhancement (CE), configures a repetition level for RLM, and performs RLM measurement based on the configured repetition level. The configured repetition level may correspond to a maximum repetition level configured per each UE or per each CE mode. Or, the configured repetition level may correspond to a maximum repetition level supported by a network.

15 Claims, 6 Drawing Sheets

(56) References Cited

OTHER PUBLICATIONS

3GPP TSG RAN WG1 #76, R1-140026, Feb. 10-14, 2014, Consideration on PRACH repetition levels and power adjustment of PRACH transmission.*

Huawei et al., "Considerations on PRACH repetition levels and power adjustment of PRACH transmission", R1-140026, 3GPP TSG RAN WG1 Meeting #76, Prague, Czech Republic, Feb. 10-14, 2014, 6 pages.

Huawei et al., "Determining the repetition level during initial random access and non-initial random access", R1-135382, 3GPP TSG RAN WG1 Meeting #75, San Francisco, USA, Nov. 11-15, 2013, 4 pages.

Interdigital et al., "WF on PRACH for Rel-13 low-complexity UE", R1-145398, 3GPP TSG RAN WG1 Meeting #79, San Francisco, USA, Nov. 24, 2014, 3 pages.

* cited by examiner

[Fig. 1]
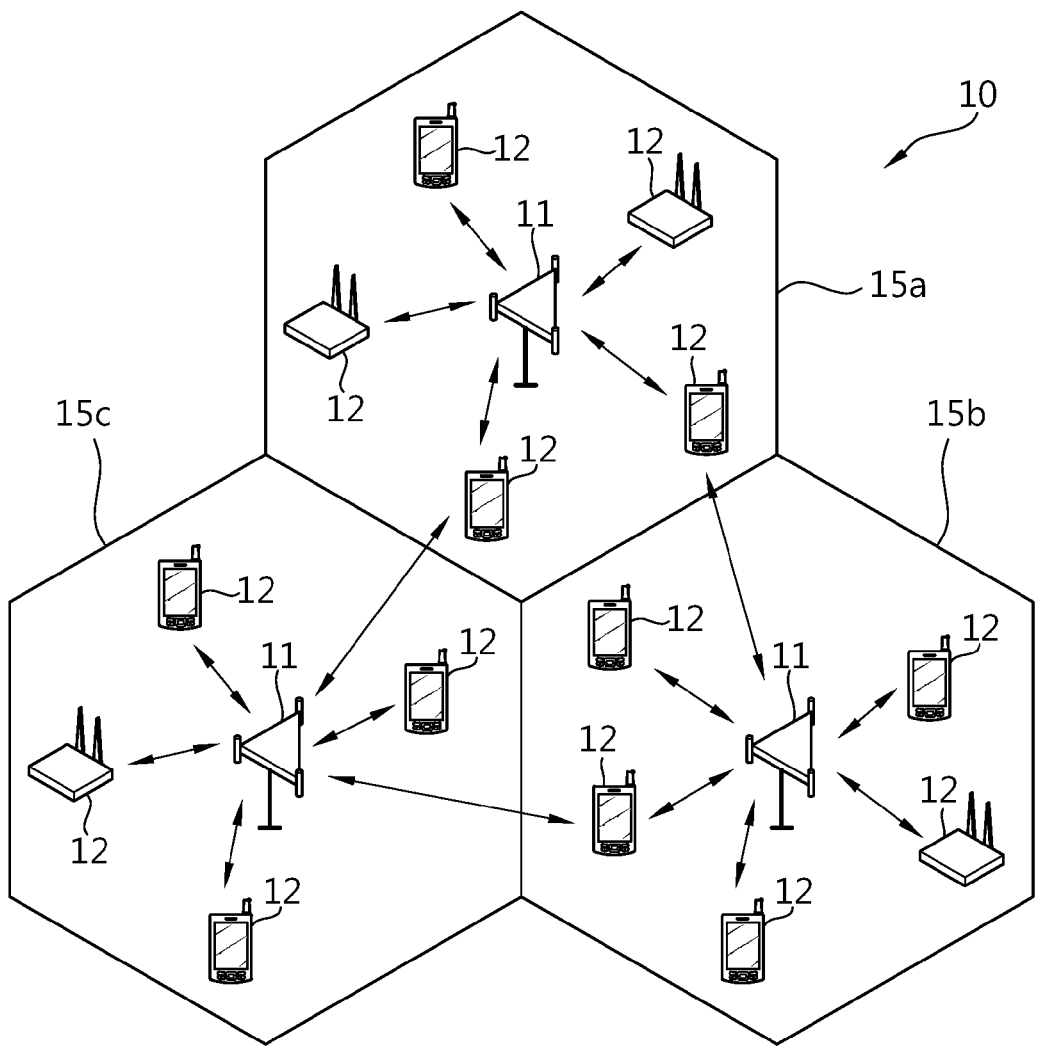
[Fig. 2]
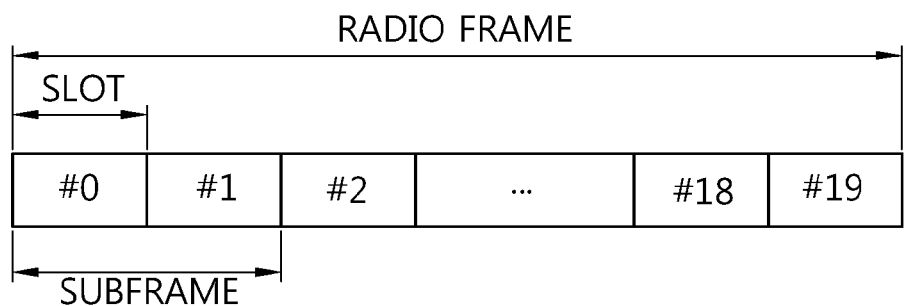

[Fig. 3]
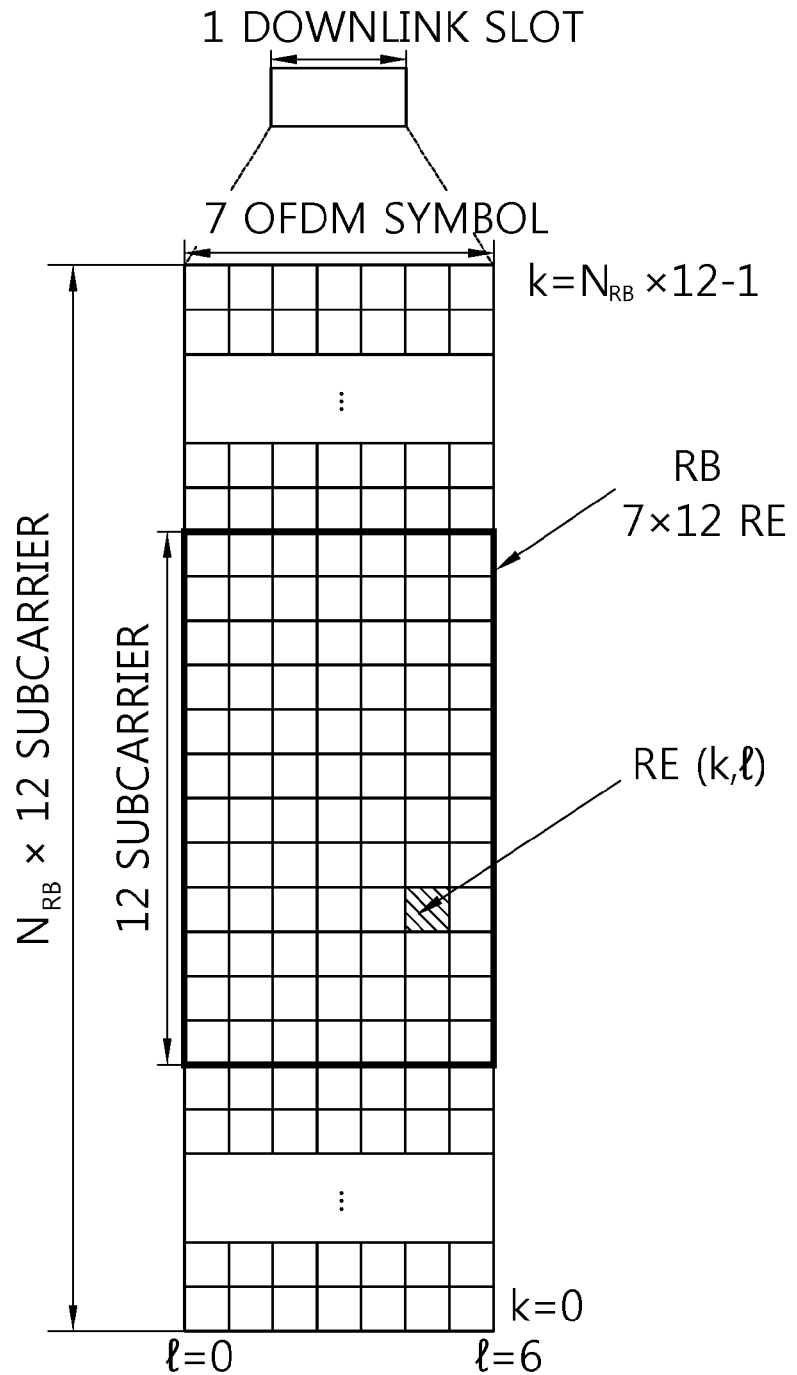

[Fig. 4]
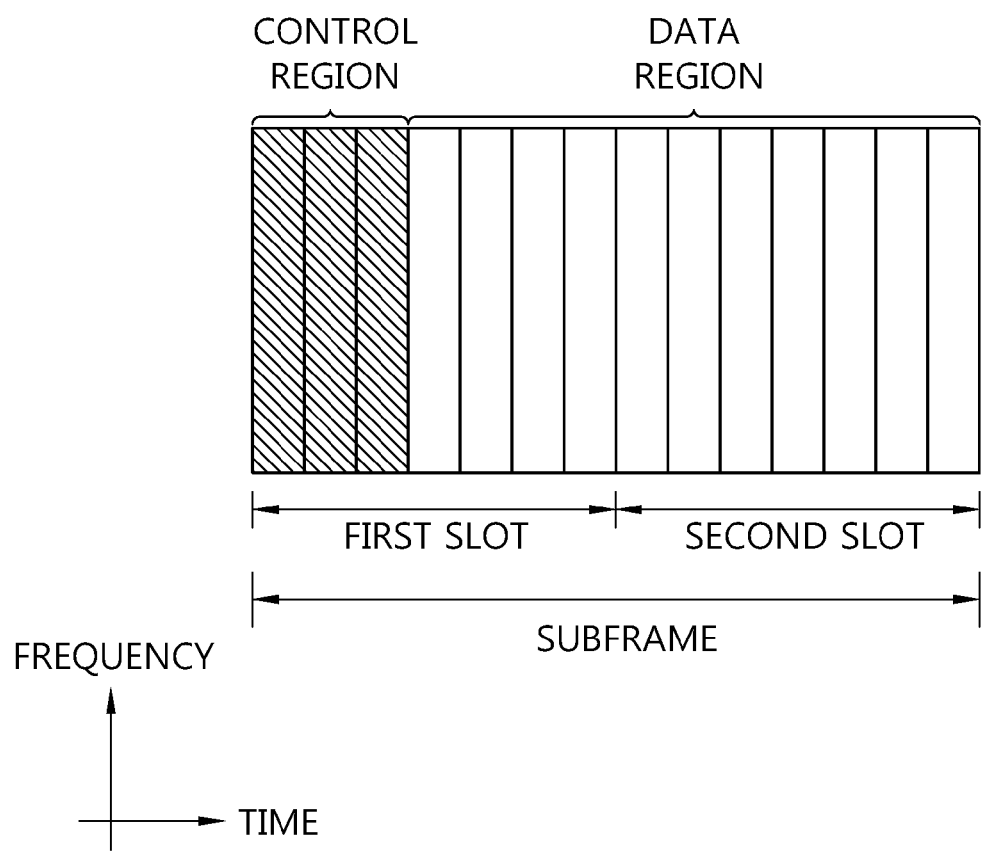

[Fig. 5]
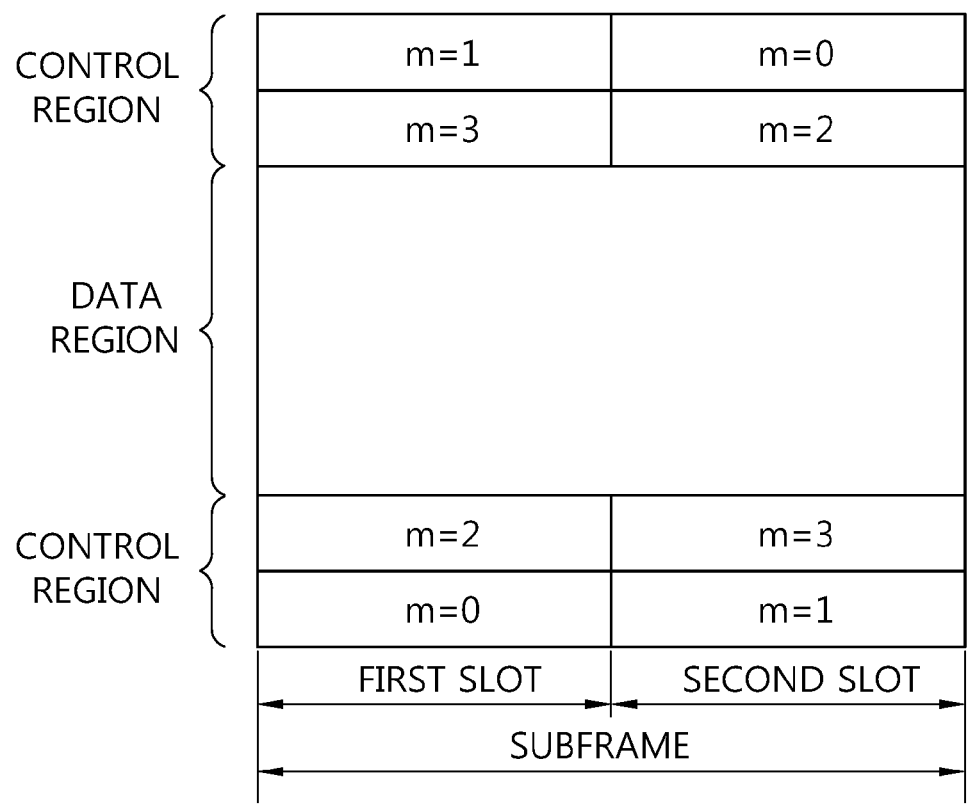

[Fig. 6]
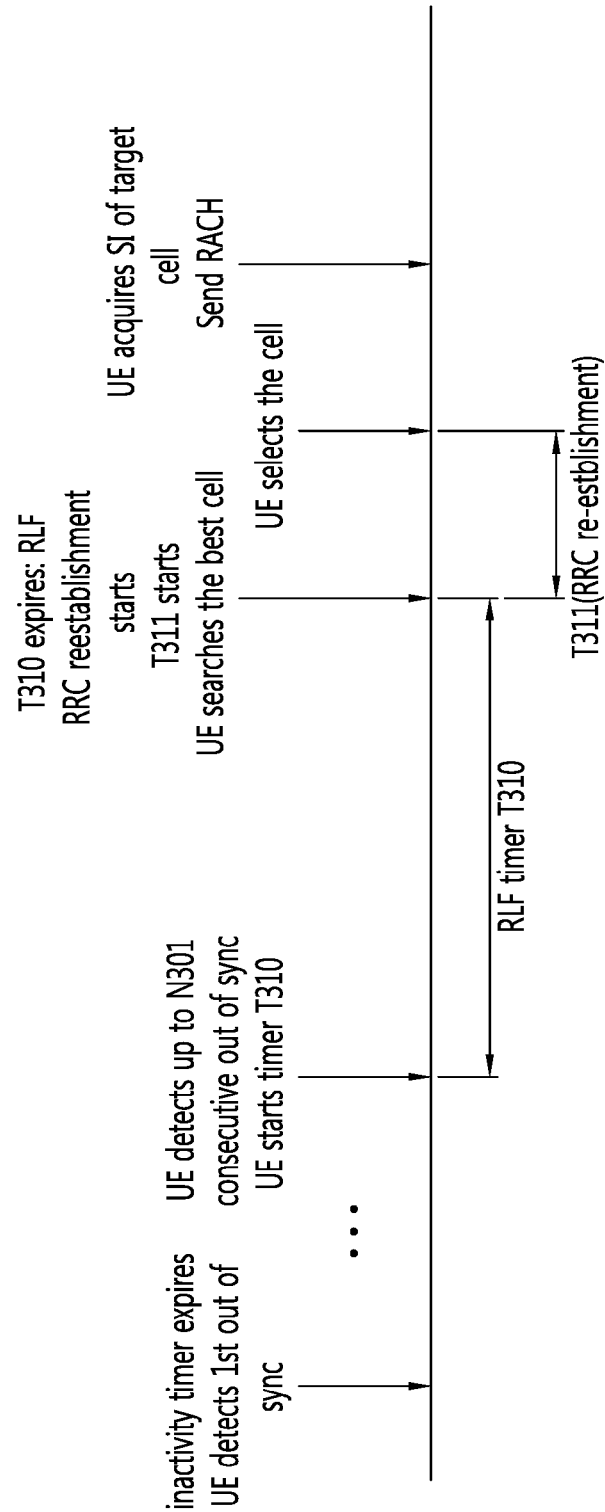

[Fig. 7]
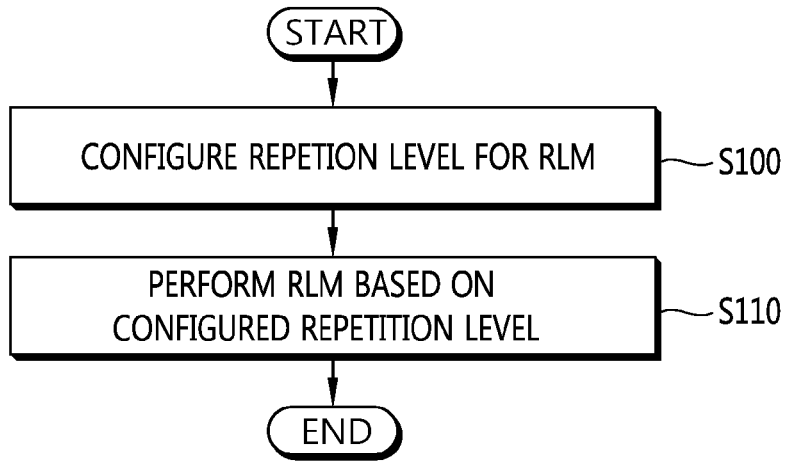
[Fig. 8]
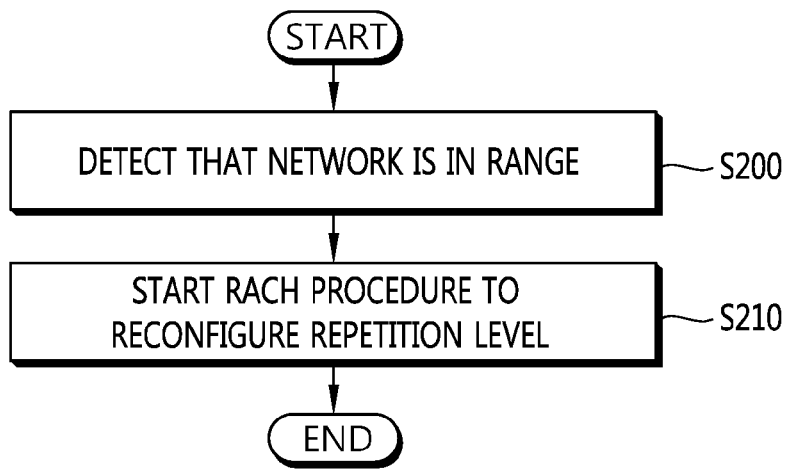
[Fig. 9]
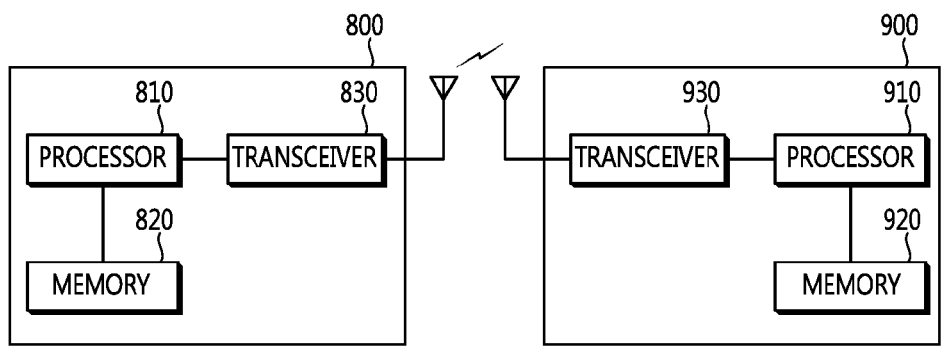

METHOD AND APPARATUS FOR CHANGING COVERAGE ENHANCEMENT/REPETITION LEVEL USED FOR RADIO LINK MONITORING IN WIRELESS COMMUNICATION SYSTEM

CROSS REFERENCE TO RELATED APPLICATIONS

This application is the National Phase of PCT International Application No. PCT/KR2016/000509, filed on Jan. 18, 2016, which claims priority under 35 U.S.C. 119(e) to U.S. Provisional Application No. 62/104,083, filed on Jan. 16, 2015, all of which are hereby expressly incorporated by reference into the present application.

TECHNICAL FIELD

The present invention relates to wireless communications, and more particularly, to a method and apparatus for changing a coverage enhancement (CE)/repetition level or CE mode used for radio link monitoring (RLM) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

In addition, there is a substantial market for the M2M use cases of devices deployed deep inside buildings which would require coverage enhancement in comparison to the defined LTE cell coverage footprint. Various methods for supporting coverage enhancement have been discussed.

DISCLOSURE OF INVENTION

Technical Problem

The present invention provides a method and apparatus for changing a coverage enhancement (CE)/repetition level used for radio link monitoring (RLM) in a wireless communication system. The present invention provides a method and apparatus for performing RLM in consideration of change of CE level or repetition level or configured CE mode.

Solution to Problem

In an aspect, a method for performing, by a user equipment (UE), radio link monitoring (RLM) in a wireless communication system is provided. The method includes configuring a repetition level for RLM, and performing RLM measurement based on the configured repetition level. The UE requires coverage enhancement.

In another aspect, a method for reconfiguring, by a user equipment (UE), a repetition level for radio link monitoring (RLM) in a wireless communication system is provided. The method includes detecting that a network is in range, and starting a random access procedure to reconfigure a repetition level for RLM.

Advantageous Effects of Invention

CE/repetition level for RLM can be changed efficiently.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows a RLM based on aggregated PDCCH.
FIG. 7 shows a method for performing RLM according to an embodiment of the present invention.
FIG. 8 shows a method for reconfiguring a repetition level for RLM according to an embodiment of the present invention.
FIG. 9 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification.

Furthermore, it is expected that those MTC UEs are installed rather coverage-limited area such as basement. Accordingly, the coverage enhancement (CE) while reducing the cost of MTC UEs may be considered. To avoid the unnecessary spectral efficiency degradation to handle coverage-limiting UEs, it is essential to best estimate the required coverage enhancement. Also, handling this new type of UEs should not jeopardize the legacy UEs which are not aware of the existence of coverage-limiting UEs.

Radio link monitoring (RLM) is described. The UE shall monitor the DL link quality based on the cell-specific reference signal in order to detect the DL radio link quality. The UE shall estimate the DL radio link quality and compare it to the thresholds $Q_{out}$ and $Q_{in}$ for the purpose of monitoring DL radio link quality. The threshold $Q_{out}$ is defined as the level at which the DL radio link cannot be reliably received and shall correspond to 10% block error rate of a hypothetical PDCCH transmission taking into account the PCFICH errors with transmission parameters. The threshold $Q_{in}$ is defined as the level at which the DL radio link quality can be significantly more reliably received than at $Q_{out}$ and shall correspond to 2% block error rate of a hypothetical PDCCH transmission taking into account the PCFICH errors with transmission parameters. When higher-layer signaling indicates certain subframes for restricted radio link monitoring, the radio link quality shall be monitored.

FIG. 6 shows a RLM based on aggregated PDCCH. A UE may perform RLM with aggregated/repeated (E)PDCCHs. Assuming a hypothetical (E)PDCCH TX occurs over the configured number of subframes, the UE may perform RLM for the aggregated/repeated (E)PDCCHs. Referring to FIG. 6, when the inactivity times expires, the UE detects the first out of sync. When the UE detects up to N301 consecutive out of sync, the UE start the radio link failure (RLF) timer T310. When the RLF timer T310 expire, the RLF occurs. Then, a radio resource control (RRC) re-establishment procedure starts, the timer T311 starts, and the UE searches the best cell. When the UE selects the best cell, the UE acquires system information of the target cell, and starts a random access procedure.

When RLM based on aggregated/repeated PDCCH is applied to the coverage-limiting UE, several problems may happen. First, since the coverage-limiting UE may not receive the PDCCH, RLM based on aggregated/repeated PDCCH may not be performed. Second, since the coverage-limiting UE may use repetition as coverage enhancement techniques, RLF may always happen. Accordingly, to avoid occurrence of RLF due to characteristics of the coverage-limiting UE, the duration of timer needs to be expanded.

Hereinafter, a method for performing radio link monitoring (RLM) for a UE requiring coverage enhancements is proposed according to an embodiment of the present invention. Further, a method for changing CE/repetition level used for RLM measurement is also proposed according to another embodiment of the present invention. In the description below, it is assumed that the network may handle both normal UEs (category 1-9 without any additions for CE techniques), low cost UE (category 0 UE or new category UE without any additions for CE techniques) and coverage limiting UEs which are operated with CE techniques. A UE requiring coverage enhancements may be referred to as one of a coverage enhancement UE, a MTC UE, a narrow(er) band UE, a small(er) band UE, or new category UE. Or, just a UE may refer one of UEs described above.

In the description below, a case where system bandwidth of available cells is larger than bandwidth that the coverage enhancement UEs can support may be assumed. For the coverage enhancement UEs, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

For a coverage-limiting UE, depending on the required coverage enhancement, it is assumed that the maximum number of repetition for each channel is determined. As an example, it is assumed that a UE is configured with 20 times of PDCCH repetition to enhance 10 dB coverage. For the coverage-limiting UE, how to perform RLM should be different from a normal UE.

First, RLM measurement according to an embodiment of the present invention is described. As described above, the RLM may be performed based on the aggregated/repeated PDCCH. For the coverage-limiting UE, the timer used for RLM and RLM procedure may have to be customized with consideration of the repetition. For example, timer setting may be increased in consideration of the number of repetition, as RLM may be performed rather infrequently than before. Currently, if a UE is not in discontinuous reception (DRX), RLM needs to be performed at least once per radio frame. For coverage enhancement UEs which may require more than a few subframes of repetition for each transmission, performing RLM at least once per radio frame may be a big burden. Accordingly, one of the following options may be considered for actual RLM measurement according to an embodiment of the present invention.

In the description below, one of the followings may be considered for the repetition level configured to a UE.

Maximum repetition level for MTC-PDCCH (M-PDCCH) configured to a UE; or

Maximum repetition level for M-PDCCH according to the CE mode where CE mode is configured to a UE.

Further in the description below, one of the followings may be considered for the maximum repetition level usable by a UE.

Maximum repetition level for M-PDCCH configured to the CE mode where CE mode is configured to a UE; or Maximum repetition level for M-PDCCH configured by the network in CE mode B which is the maximum repetition level that the network supports.

It is also noted that a UE may perform RLM measurement based on the maximum repetition level for the configured CE mode, and then also perform RLM measurement for the other value of maximum repetition number for the other CE mode, in case a UE reports both RLM measurement results or a UE performs another RLM measurement in case the first RLM shows out-of-sync or RLF.

(1) Similar to legacy UE, RLM may be performed per each radio frame. Since RLM needs to be performed for a bundled transmission (or repeated subframes—assuming control channels and/or data channels are transmitted in a bundle), a UE may emulate received signal-to-interference and noise ratio (SINR) and decoding (E)PDCCH performance for a bundled transmission using the measurement observed in a subframe. In other words, the received SINR at one subframe may be emulated/estimated for the aggregated SINR for the hypothetically repeated transmission, as if (E)PDCCH is transmitted over the subframes with the same SINR of the measured subframe. Alternatively, some variation or weighted averaging or randomization may be further considered instead of assuming the same channel condition per each subframe. Using this approach, if a UE is in DRX, a UE shall perform RLM at least once per DRX cycle. Whether a UE utilizes one subframe or not may depend on UE implementation.

(2) RLM may be performed rather infrequently by utilizing the bundled subframes and hypothetical (E)PDCCH transmission over those subframes. For example, if the number of repeated subframes is 'm', RLM may be measured at least once per every 'm' radio frame, if the UE is not in DRX. For each measurement, measurement over 'm' subframes may be used where the selection of 'm' subframes may depend on UE implementation. Or, 'm' subframes may be selected where (E)PDCCH bundle can be transmitted. Using this approach, if a UE is in DRX, a UE may perform RLM at least once per DRX cycle. It is assumed that 'm' subframes are used per each DRX cycle. Thus, if DRX cycle is less than 'm' valid subframes where (E)PDCCH bundle can be transmitted, a UE may perform RLM at least once per max {N, DRX cycle}, where N is the duration to allow at least 'm' valid subframes where (E)PDCCH bundle can be transmitted.

(3) Regardless of bundle size, RLM may be performed rather infrequently. Within each measurement, whether to utilize one or multiple subframes may be up to the UE implementation. Using this approach, if a UE is in DRX, a UE shall perform RLM at least once per DRX cycle.

Alternatively, the requirement of RLM measurement for a UE may be different when it is configured or not configured with DRX. For example, approach (2) described above may be used for the UE without DRX configured, whereas approach (3) described above may be used for the UE with DRX configured.

For each measurement, the RLM measurement may be performed by one of the following options. Hereinafter, CE level and repetition level may be used as the same meaning.

(1) RLM may be performed based on the configured CE/repetition level. More specifically, if there are multiple repetition CE/levels specified in the system, the CE/repetition level used for RLM may be based on the maximum CE/repetition level configured by the UE or the maximum CE/repetition level supported by the network. The maximum CE/repetition level configured by the UE may be configured per each UE or per each CE mode. The maximum CE/repetition level supported by the network may be configured by higher layer.

For example, the CE/repetition level used for RLM measurement may be the CE/repetition level configured for (E)PDCCH transmission for unicast. This is for triggering RLF only when the UE cannot be served by the network even though the UE is configured with the maximum CE/repetition level or allowed number of repetitions supported by the network. Alternatively, in case where multiple CE/repetition levels are configured for the UE, the maximum among the configured CE/repetition levels may be used for RLM in order to test whether the network connectivity can be maintained with the use of the maximum configured CE/repetition level.

(2) Similar to option (1) described above, RLM may be performed based on bundled (E)PDCCH or assuming bundled (E)PDCCH. Since the CE/repetition level of the UE may change, yet, it does not mean RLF, it may be considered to provide RLM as follows.

RLM may be reported on each CE/repetition level. Assuming a set of prefixed/configured CE/repetition levels, in terms of measuring RLM, a UE may perform RLM on each level each time. In terms of reporting, the UE may report the lowest CE/repetition level where in-sync is detected or report all the measurements per different CE/repetition levels. In terms of reporting, the UE may also report CE/repetition level. In terms of starting CE/repetition level, the UE may utilize the configured CE/repetition level for a starting level or may start from the lowest CE/repetition level all the time. In terms of ending CE/repetition level, the UE may stop if in-sync is detected at a certain CE/repetition level. If in-sync is not detected even with the maximum CE/repetition level that the network supports, the UE may trigger out-of-sync. Or, the UE may trigger out-of-sync, if out-of-sync is detected based on the configured CE/repetition level for control channel of unicast transmission.

RLM may be reported on the configured CE/repetition level and measured on the maximum CE/repetition level in case out-of-sync is detected for the configured CE/repetition level. Since it may mean that the required CE/coverage level has been changed, the UE may perform RLM on the maximum CE/repetition level. If in-sync is detected for the maximum CE/repetition level, the UE may report in-sync along with a flag which indicates that in-sync is detected based on the maximum CE/coverage level. Or, the UE may transmit CE/repetition level where in-sync is detected. If out-of-sync is detected in the maximum CE/repetition level, the UE may report out-of-sync.

RLM may be measured on the configured CE/repetition level until the first out-of-sync detection occurs. If the first out-of-sync detection occurs, and thus, N301 or similar timer starts, the UE may perform RLM on the maximum CE/repetition level or may perform RLM on the next CE/repetition level from the configured CE/repetition level. If in-sync is detected with different CE/repetition level, the UE may report in-sync with CE/repetition level used. In case the next CE/repetition level is used and still out-of-sync is detected, the UE may further increase CE/repetition level until in-sync is detected or the maximum CE/repetition level is reached.

FIG. 7 shows a method for performing RLM according to an embodiment of the present invention. In step S100, the UE configures a repetition level for RLM. In step S110, the UE perform RLM measurement based on the configured repetition level. The UE requires coverage enhancement. The configured repetition level may correspond a maximum repetition level configured for (E)PDCCH transmission, or M-PDCCH transmission. Or, the configured repetition level may correspond a maximum repetition level supported by a network. The RLM measurement may be performed based on bundled PDCCH or bundled EPDCCH.

The UE may further transmit a result of the RLM measurement to a network. The result of the RLM measurement may be transmitted according to each repetition level. Or, the result of the RLM measurement may be transmitted according to the lowest repetition level where in-sync is detected. Or, the result of the RLM measurement may be transmitted according to the configured repetition level for RLM. Or, the result of the RLM measurement may be transmitted according to a maximum repetition level configured for PDCCH transmission, EPDCCH transmission or M-PDCCH transmission. That is, the result of the RLM measurement may be transmitted according to a maximum repetition level which is supported by the configured coverage mode, not a maximum repetition level supported by the network.

Increase or decrease repetition level for (E)PDCCH transmission according to an embodiment of the present invention is described. To optimize and minimize the repetition overhead, it is expected that a UE can be higher layer configured with the number of repetitions for each channel or a single number for all the channels. However, due to inaccurate measurement or potential movement of the UE, it is also possible to change the CE/repetition level. When CE/repetition level is reconfigured, it is possible to have ambiguity between eNB and the UE. In case there is no cell-broadcast search space (CSS) is defined where all control channels are transmitted only via UE-specific search space (USS), it may be assumed that higher layer configurations can be scheduled using a DCI via USS. In that case, DCI 1A or a DCI format used for transmitting RRC message (or random access response (RAR)/paging if used) via USS may be assumed that the CE/repetition level is fixed which may be configured by RAR or SIB or physical broadcast channel (PBCH).

Another possibility is to change the subband based on CE/repetition level such that a UE may have to switch the frequency in case of reconfiguration. Another possibility is to perform blind detection on the CE/repetition level on control channel which can define the CE/repetition level for scheduled PDSCH. For example, a UE may have to blindly detect at least a few CE/repetition levels similar to aggregation level. In this case, the number of repeated subframes may be constant regardless of CE/repetition level for control channel. Depending on CE/repetition level discovered by control channel, the number of repeated subframes may be determined for data channel. Another possible approach to change repetition level of data is to fix the number of repetition subframes where the number of allocated RB can change (i.e. decrease code rate to increase CE/repetition level). In this case, a transport block size (TBS) may need to be pre-allocated or semi-statically configured. Or, a new field may be added in DCI to indicate TBS, as modulation and coding scheme (MCS)/resource allocation (RA) field may not indicate the TBS. Or, simply changing MCS may be used to adapt the CE/repetition level while keeping the same repetition number of subframes.

This may be the same number as used for cell-common PDSCH transmission or may be signalled via SIB or MIB. More specifically, the number of repetitions used for DCI 1A or a DCI format used for transmitting RRC message (or RAR/paging if used) may be assumed to be the same if scheduled via CSS. In RRC reconfiguration period, when DCI 1A or a DCI format used for transmitting RRC message (or RAR/paging if used) is used, this repetition number may be assumed. In other words, a separate configuration on CE/repetition level which may be achieved via initial access procedure (such as via RAR) or configuration via cell-broadcast channel, such as SIB, may be assumed which may be different from CE/repetition level of unicast data and/or unicast control channel.

Another option is to use different orthogonal cover code (OCC) value per CE/repetition level on demodulation reference signal (DM-RS) for control channel transmission, if control channel is transmitted based on DM-RS. By detecting DM-RS, the UE may estimate the CE/repetition level. In general, a separate signal may also be considered to indicate CE/repetition level.

Another approach is to perform blind detection between the configured CE/repetition level and maximum CE/repetition level (e.g. fallback CE level). In case a UE's CE/repetition level is mis-configured or reconfigured, fallback CE/repetition level may be used. If this is supported, a UE may blindly detect control/data channel between the configured CE/repetition level and maximum (fallback) CE/repetition level. In case of RRC reconfiguration, only fallback CE/repetition level may be used.

Increase or decrease repetition level for data transmission (e.g. PDSCH) according to an embodiment of the present invention is described. For data transmission, the CE/repetition level may also be changed. In this case, either the CE/repetition level may be indicated by DCI (e.g. value 0 indicates the configured repetition level for data transmission or value 1 indicates the maximum CE/repetition level for data transmission). Or, a UE may blindly detect the CE/repetition level used in data transmission. If a UE supports HARQ-combining, retransmission may be aggregated with initial transmission, and thus, the increase of CE/repetition level per retransmission may not be needed. However, such as for paging where HARQ-combining is not supported, generally retransmission may require higher CE/repetition level. Thus, for example for paging, different configuration may be configured per each CE/repetition level where each UE may monitor various CE/repetition levels, as the UE may not know in which CE/repetition level that the network transmits paging (e.g. the network may increase CE/repetition level per retransmission, since the UE does not know the number of trials the network had performed, and the UE may not know which CE/repetition level will be used for paging transmission at a given time).

For each CE/repetition level, separate resource (e.g. different frequency location) may be used. Thus, depending on the resource allocation, the UE may infer the used CE/repetition level for data transmission. Or, by combining fields in DCI, a UE may determine the used CE/repetition level. Another approach is to use embed CE/repetition level in cyclic redundancy check (CRC) generation such that CRC contains the information of CE/repetition level of data channel. In case the number of repeated subframes are different, a UE may blindly search a few candidates with different numbers of subframes and validate the number by checking CRC where CE/repetition level is embedded in the CRC. As described above, a straightforward approach is to associate CE/repetition level of control channel to the data channel. When repetition level for control channel is increased, the UE can assume repetition level for data channel is also increased.

System level procedure to change/adapt CE/repetition level according to an embodiment of the present invention is described. It is assumed that the CE/repetition level per each channel or per UE is configured by the network via explicit or implicit configuration. The explicit configuration may include explicit RRC configuration. The implicit configuration may include mechanisms to (in)directly map some configurations/resources to the CE/repetition level. One example is to map C-RNTI to a CE/repetition level or subband (frequency location) to a CE/repetition level. When a UE is configured with CE/repetition level or UE is configured with CE mode, in what conditions the UE can change CE/repetition level or leave the CE mode needs to be determined.

The condition of change (either change CE/repetition level or change the CE mode) may be determined based on UE and/or network measurements/events, which are determined by the network or UE. For the measurements, RLM/RRM may be used. For the events, from the network perspective, the event may include physical random access channel (PRACH) from a UE where the CE/repetition level may be determined based on the repetition/CE level used in PRACH. Or, for the events, a trigger from a UE with low reliability on PDCCH may be used. To support this, a UE may monitor the reliability probability of PDCCH. For this, a mechanism to indicate retransmission of PDCCH or the number of PDCCH scheduled to the UE so far may need to be added. More specifically, (E)PDCCH or control channel may include information about retransmission counter or the sequence number of control channel scheduled to the UE where the sequence number may be increased for the new data scheduling. Another approach is to utilize a new data indicator (NDI) toggle where a UE may detect NDI toggle not set without receiving any data before (i.e. the UE could not detect control channel before), the UE may assume control channel has been retransmitted. The probability of retransmission of control channel may be used to indicate whether the currently configured CE/repetition level is appropriate or not.

Alternatively, the network may also perform measurements based on UL signals such as sounding reference signal (SRS) or HARQ-ACK to estimate the CE/repetition level. For example, when a UE transmits a NACK, the UE may increase the CE/repetition level for the NACK (assuming that the network may be able to perform blind decoding or NACK-container may include information about CE/repetition level) such that the network may adapt CE/repetition level based on NACK CE/repetition level. Another measurement may be based on reference signal received power (RSRP)-like measurement or based on SIB reading. For example, if SIB is read successfully without repetition to support coverage enhancement, it may assume that it may switch back to normal mode from CE mode.

When the network or UE determines that the CE/repetition level needs to be changed, the following mechanism may be considered.
  RRC reconfiguration of CE/repetition level: if this is used, a UE may assume that the CE/repetition level of RRC reconfiguration message (potentially including control channel of RRC configuration message) is fixed.
  Re-start of initial procedure such as RACH procedure: if a UE determines CE/repetition level needs to be changed, the UE may re-start RACH procedure. This may be a new trigger condition of RACH procedure.
  Dynamic change of CE/repetition level: instead of configuring a fixed CE/repetition level, dynamically CE/repetition level may be selected. One mechanism described above is to map the CE/repetition level of control channel to the CE/repetition level of data channel.

More specifically, when a UE detects RLF by RLM measurement based on the configured repetition/coverage level, a UE may autonomously restart RACH procedure to re-establish CE/repetition level. In this case, the UE may perform RLM based on the maximum CE/repetition level to see whether the network is in fact in range or not. If the network is in range (i.e. RLF can be avoided by RLM measurement based on the maximum CE/repetition level that the network supports), the UE may re-start RACH procedure to reconfigure CE/repetition level. Otherwise, the UE may start RLF procedure to find alternative cell.

For this, the overall procedure may be as follows. First, RLM measurement is performed based on the configured CE/repetition level. If out-of-sync occurs, a timer for RLF may be started. If the configured CE/repetition level is smaller than the maximum CE/repetition level that the network supports, RLF for the maximum CE/repetition level may be validated. If RLF occurs, RLM measurement (start a new timer for final RLF) based on the maximum CE/repetition level that the network supports may be performed. In this case, the maximum CE/repetition level may mean the maximum CE/repetition level that the network is going to support. If the network does not support CE, the maximum CE/repetition level may be 0 dB. If in-sync is observed and thus state changes to in-sync from out-of-sync, RACH procedure may be started to reconfigure CE/repetition level. Otherwise, RLF procedure may be started.

Regardless of re-start of PRACH, RLF procedure may be similar. In other words, when RLF occurs with the configured CE/repetition level, and if the configured CE/repetition level is lower than the maximum CE/repetition level, the UE may perform another RLM measurement to check whether RLF may not occur if CE/repetition level is changed.

FIG. 8 shows a method for reconfiguring a repetition level for RLM according to an embodiment of the present invention. In step S200, the UE detects that a network is in range. In step S210, the UE starts a random access procedure to reconfigure a repetition level for RLM. For detecting that the network is in range, the UE may perform RLM measurement based on a maximum repetition level.

Before detecting that the network is in range, the UE may further perform RLM measurement based on a configured repetition level. The UE may detect a RLF by the RLM measurement based on the configured repetition level. The UE may validate the RLF for the maximum repetition level. The configured repetition level may be smaller than the maximum repetition level. When RLF occurs, the UE may further perform another RLM measurement based on another repetition level.

Further, the maximum CE/repetition level per channel may be also different as well as different per search space (CSS vs USS) or per broadcast vs unicast. In such a case, CSS and USS (or broadcast and unicast transmissions) may be separated in time (i.e. CSS or broadcast occurs in a subset of subframes and USS or unicast occurs in a different subset of subframes) so that different repetition numbers are not mixed in a single UE reception. From RLM measurement perspective, maximum CE/repetition value may be assumed as the maximum CE/repetition level configured for control channel of unicast. Alternatively, the maximum CE/repetition level may be the minimum of maximum CE/repetition levels per each category. In other words, if any channel cannot be received within the supported maximum CE/repetition level, the UE may trigger RLF on the serving cell.

As another alternative, the CE/repetition level for RLM measurement (i.e. the number of repetitions used for the hypothetical (E)PDCCH transmissions) may be different in different threshold test during the RLM procedure. More specifically, in measuring (E)PDCCH performance for out-of-sync which is to check whether the UE can keep the minimum level of connectivity to the cell, the repetition numbers (the maximum number in case of multiple repetition numbers are used) of CSS or broadcast transmissions may be used. In this case, in case of out-of-sync, the UE may declare RLF and move to another cell under the assumption that the very basic control information such as SIB or RAR cannot be received from the current serving cell. On the other hand, in measuring (E)PDCCH performance for in-sync which is to check whether the scheduling of normal user traffic can be properly done, the repetition number (the maximum number in case of multiple repetition numbers are used) of USS or unicast transmissions may be used. In this case, in case of in-sync, the UE may assume that there is no problem in the radio link for the transmission/reception of normal unicast.

RLM measurement test cases according to an embodiment of the present invention is described. RLM may be based on a control channel used for coverage enhancement mode UE, particularly, a DCI type used for unicast data transmission or DCI used for RRC message may be used. In terms of parameters and demodulation RS, the same RS and configurations including power boosting may assumed in the test cases. A certain power-boosting level on DM-RS may be assumed for test cases. Also, the repetition number (e.g. the number of subframes used for repetition) may be configured/prefixed for the test case along with aggregation level. In other words, if techniques or configurations used for control channel of unicast or control channel used for RRC message may be used for RLM measurement.

FIG. 9 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for performing, by a user equipment (UE), a radio link monitoring (RLM) in a wireless communication system, the method comprising:
configuring a repetition level for the RLM;
performing a first RLM measurement based on the configured repetition level;
detecting a radio link failure (RLF) by the first RLM measurement based on the configured repetition level;
based on that the configured repetition level is smaller than a maximum repetition level, configuring the maximum repetition level, which is supported by a network, as the repetition level for the RLM, after the RLF is detected;
performing a second RLM measurement based on the maximum repetition level;
determining that a network is in range that a scheduling of user traffic to the UE is possible based on that in-sync is detected based on the second RLM measurement, which has been performed based on the maximum repetition level; and
starting a random access procedure to reconfigure the repetition level for the RLM, based on that the network is determined to be in the range,
wherein the UE requires coverage enhancement,
wherein the repetition level is related to a repetition of a physical downlink control channel (PDCCH) or an enhanced PDCCH (EPDCCH), and
wherein for each repetition level, a different frequency location is used for the PDCCH or the EPDCCH.

2. The method of claim 1, wherein the configured repetition level is related to the maximum repetition level configured for PDCCH transmission, EPDCCH transmission or machine-type communication (MTC) PDCCH (MPDCCH) transmission.

3. The method of claim 1, wherein the first RLM measurement or the second RLM measurement is performed based on a bundled PDCCH or a bundled EPDCCH.

4. The method of claim 1, further comprising:
transmitting a result of the first RLM measurement or the second RLM measurement to the network.

5. The method of claim 4, wherein the result of the first RLM measurement or the second RLM measurement is transmitted based on each repetition level.

6. The method of claim 4, wherein the result of the first RLM measurement or the second RLM measurement is transmitted based on a lowest repetition level where an in-sync is detected.

7. The method of claim 4, wherein the result of the first RLM measurement or the second RLM measurement is transmitted based on the configured repetition level for the RLM.

8. The method of claim 4, wherein the result of the first RLM measurement or the second RLM measurement is transmitted based on the maximum repetition level configured for PDCCH transmission, EPDCCH transmission or machine-type communication (MTC) PDCCH (MPDCCH) transmission.

9. The method of claim 1, wherein the UE detects that the network is in range, when the RLF is avoided by the second RLM measurement based on the maximum repetition level.

10. The method of claim 1, further comprising:
validating the RLF for the maximum repetition level when the configured repetition level is smaller than the maximum repetition level.

11. A user equipment (UE) for performing a radio link monitoring (RLM) in a wireless communication system, the UE comprising:
a memory;
a transceiver; and
a processor connected with the memory and the transceiver, wherein the processor is configured to:
configure a repetition level for the RLM;
perform a first RLM measurement based on the configured repetition level;
detect a radio link failure (RLF) by the first RLM measurement based on the configured repetition level;
based on that the configured repetition level is smaller than a maximum repetition level, configure the maximum repetition level, which is supported by a network, as the repetition level for the RLM, after the RLF is detected;
perform a second RLM measurement based on the maximum repetition level;
determine that a network is in range that a scheduling of user traffic to the UE is possible based on that in-sync is detected based on the second RLM measurement, which has been performed based on the maximum repetition level; and
start a random access procedure to reconfigure the repetition level for the RLM, based on that the network is determined to be in the range,
wherein the UE requires coverage enhancement,
wherein the repetition level is related to a repetition of a physical downlink control channel (PDCCH) or an enhanced PDCCH (EPDCCH), and
wherein for each repetition level, a different frequency location is used for the PDCCH or the EPDCCH.

12. The UE of claim 11, wherein the configured repetition level is related to the maximum repetition level configured for PDCCH transmission, EPDCCH transmission or machine-type communication (MTC) PDCCH (MPDCCH) transmission.

13. The UE of claim 11, wherein the first RLM measurement or the second RLM measurement is performed based on a bundled PDCCH or a bundled EPDCCH.

14. The UE of claim 11, wherein the UE detects that the network is in range, when the RLF is avoided by the second RLM measurement based on the maximum repetition level.

15. The UE of claim 11, wherein the processor is further configured to:
validate the RLF for the maximum repetition level when the configured repetition level is smaller than the maximum repetition level.

* * * * *